United States Patent
Belbachir et al.

(10) Patent No.: US 10,358,732 B2
(45) Date of Patent: Jul. 23, 2019

(54) PROCESS FOR PRODUCING A CARBON PASTE FOR THE MANUFACTURE OF HIGH-DENSITY ELECTRODES

(71) Applicant: FIVES SOLIOS, Le Pecq (FR)

(72) Inventors: Salima Belbachir, Givors (FR); Jean-Francois Andre, Givors (FR); Christophe Bouche, Givors (FR); Olivier Felix, Givors (FR); Christian Gonzalez, Givors (FR); Andre Pinoncely, Givors (FR); Bertrand Somnard, Givors (FR)

(73) Assignee: FIVES SOLIOS, Le Pecq (FR)

( * ) Notice: Subject to any disclaimer, the term of this patent is extended or adjusted under 35 U.S.C. 154(b) by 32 days.

(21) Appl. No.: 15/538,055

(22) PCT Filed: Dec. 4, 2015

(86) PCT No.: PCT/FR2015/053319
§ 371 (c)(1),
(2) Date: Jun. 20, 2017

(87) PCT Pub. No.: WO2016/107998
PCT Pub. Date: Jul. 7, 2016

(65) Prior Publication Data
US 2017/0350027 A1     Dec. 7, 2017

(30) Foreign Application Priority Data
Dec. 30, 2014     (FR) ...................................... 14 63422

(51) Int. Cl.
*C25C 3/00*     (2006.01)
*C25C 3/12*     (2006.01)
(Continued)

(52) U.S. Cl.
CPC ................ *C25C 3/125* (2013.01); *B01D 3/14* (2013.01); *B01F 3/12* (2013.01); *B01F 13/10* (2013.01);
(Continued)

(58) Field of Classification Search
CPC ... C25C 3/125; B01D 3/14; B01F 3/12; B01F 13/10; B01F 2013/1052; C04B 18/02; C04B 26/26; C04B 2111/00844
See application file for complete search history.

(56) References Cited

U.S. PATENT DOCUMENTS

| | | | |
|---|---|---|---|
| 2,645,583 A | 7/1953 | Stefan et al. | |
| 6,838,024 B1 | 1/2005 | Dreyer et al. | |
| 2012/0228411 A1* | 9/2012 | Andre | B01F 9/0007 241/3 |

FOREIGN PATENT DOCUMENTS

| | | |
|---|---|---|
| FR | 992 508 A | 10/1951 |
| FR | 1 073 696 A | 9/1954 |

(Continued)

OTHER PUBLICATIONS

International Search Report, dated Mar. 10, 2016, from corresponding PCT/FR2015/053319 application.

*Primary Examiner* — Anshu Bhatia
(74) *Attorney, Agent, or Firm* — Young & Thompson

(57) ABSTRACT

The disclosed method proposes, for the mixing of a solid and dry granular mixture and a liquid bituminous binder, the solid and dry granular mixture being a mixture of two fractions of constituents, one of which is a coarse fraction including aggregates, the other fraction a fraction of submillimeter fines, that the mixing includes at least two consecutive mixing steps: an aggregate-preimpregnation step, consisting of mixing the coarse fraction of the granular mixture with a part of the bituminous binder, in a quantity at least sufficient for coating the aggregates and at least
(Continued)

partially filling the open pore spaces of the aggregates; and a covering mixing step, which consists of mixing the pre-impregnated coarse fraction of bituminous binder and originating from the first mixing step, with the balance of the bituminous binder, required for the manufacture of the electrodes, and with the fraction of fines of the granular mixture.

19 Claims, 3 Drawing Sheets

(51) Int. Cl.
  *C04B 26/26* (2006.01)
  *B01D 3/14* (2006.01)
  *B01F 3/12* (2006.01)
  *B01F 13/10* (2006.01)
  *C04B 18/02* (2006.01)
  C04B 111/00 (2006.01)
(52) U.S. Cl.
  CPC .............. *C04B 18/02* (2013.01); *C04B 26/26* (2013.01); *B01F 2013/1052* (2013.01); *C04B 2111/00844* (2013.01)

(56) References Cited

FOREIGN PATENT DOCUMENTS

| WO | 01/38253 A1 | 5/2001 |
| WO | 03/018275 A1 | 3/2003 |
| WO | 2008/083472 A1 | 7/2008 |
| WO | 2011/064461 A1 | 6/2011 |

* cited by examiner

PROCESS FOR PRODUCING A CARBON PASTE FOR THE MANUFACTURE OF HIGH-DENSITY ELECTRODES

1. FIELD OF APPLICATION

The present invention relates to a method for preparing a carbonaceous paste for the manufacture of high-density electrodes, and more precisely a sequenced mixing method for obtaining a carbonaceous paste, intended for the manufacture of high-density electrodes, and in particular of anodes intended for the electrolysis of aluminium, as well as means for implementing said method.

2. STATE OF THE ART

It is known, in particular from FR 992 508 and FR 1 073 696, that carbon electrodes, and in particular anodes for the electrolysis of aluminium, are manufactured from a paste constituted by mixing, in well-defined proportions, on the one hand a solid and dry carbonaceous granular mixture, of known and controlled granulometric distribution, and containing both aggregates which can reach 10 to 30 mm, as well as a certain proportion of submillimeter fines, more generally of dimensions less than 100 μm (typically these fines contain 18 to 22% by weight of fines <74 microns and 12 to 18% of fines <32 microns in the particular case of the manufacture of the anodes for the electrolysis of aluminium) and, on the other hand a liquid bituminous binder, the term bituminous binder denoting both the heavy hydrocarbon-containing residues originating from the oil industry and those originating from the coal industry, and more particularly coal-tar pitches, or also those originating from the bio-sourced industries.

The use of a liquid bituminous binder requires implementation at a temperature above its softening point (hereafter denoted by the abbreviation SP), which can be characterized by different standardized methods, that used for reference in the present specification being the ISO 5940-2 Mettler method. In order to sufficiently lower the viscosity of the binder, on the one hand, for pumping and flow requirements, and on the other hand to promote its "coating" and "penetration" properties as described hereafter, the implementation temperature must typically be at least 30° C. above the SP obtained by the Mettler method, and is more generally situated at least 60 to 70° C. above this SP, or even 90° C. above the SP in certain most recent applications in the field of the manufacture of anodes for the electrolysis of aluminium.

The bituminous binder is therefore either delivered cold in solid form then melted at the place of use, or delivered directly hot in liquid form. In both cases, a buffer stock is constituted in heated isothermal tanks, which keep the binder close to its end-use temperature.

As shown diagrammatically in FIG. 1a, the production of a homogeneous paste is therefore ensured by a step of preheating the granular mixture 1, supplying the preheater 101, in order that the binder does not immediately set on the cold surface of the aggregates, followed by a step of mixing and kneading, in the mixer 102, of the preheated granular mixture 2, leaving the preheater 101, with the liquid bituminous binder 3, also supplying the mixer 102. On leaving the mixer 102, a carbonaceous paste 5 is obtained, supplying the forming, ensured in a press or a vibrating compactor 104, delivering electrode blocks 6 at the forming outlet.

By homogeneity of the paste, is meant a homogeneous distribution of the binder, on the one hand, around aggregates of the granular mixture, which is defined as the "coating" property of the binder, and in the intergranular voids, which is defined as the "covering" property of the binder, and, on the other hand, by a maximum and uniformly distributed filling of the open pore spaces of the aggregates of the granular mixture which is defined by the "penetration" property of the binder. These two properties together contribute to improving the density of the electrodes, this parameter appearing as the key quality criterion, as it is directly correlated with the electrical conductivity and with the durability of the electrodes in the electrolytic process.

The mixing step can be carried out:
   discontinuously, using mixers with horizontal shafts, one of the best known of which is the "Z-arm" mixer, or also mixers with a horizontal or tilted rotary tank, in which a mixing and kneading tool rotates like a kneader with, in both cases, a supply of the bituminous binder onto the preheated dry granular mixture feedstock,
   or continuously, using a tubular mixer with a horizontal screw, the reciprocating axial movement of which is superimposed on the rotational movement of the screw, and into which the preheated granular mixture, then the bituminous binder, are introduced at one end of the screw, and the mixture undergoes a multitude of shearing cycles between blades of the screw and the body of the device, during its progression before being discharged at the opposite end of the device, or also a mixer with a tilted rotating tank, in which a mixing and kneading tool rotates like a kneader, and in which the bituminous binder is deposited on the mixture during preparation, downstream of the point of introduction of the dry granular mixture.

In certain recent continuous-process applications, such as the manufacture of anodes for aluminium since the 1990s, a last step of cooling the paste by injection of water into a final mixer-cooler makes it possible to dissociate the mixing temperature from the electrode-forming temperature in the downstream step. It is therefore possible to mix at a higher temperature than the maximum forming temperature generally defined by the flow initiation temperature of the electrode on removing from the mould, and thus to benefit from the lower viscosity of the bituminous binder in order to promote its penetration into the open pore spaces of the aggregates. In the production of anodes for the electrolysis of aluminium, the mixing temperature can thus be adjusted to approximately 25 to 30° C. above the forming temperature. Unfortunately, the injection of water and its vaporization on contact with the hot carbonaceous paste generate significant volatilization of the light organic compounds in the bituminous binder, which then have to be collected and treated in order to protect the environment.

FIG. 1b diagrammatically shows this method, which includes the same steps as the method of FIG. 1a as far as the mixer 102. On leaving the mixer 102, the carbonaceous paste 4 supplying the mixer-cooler 103 can be cooled by an injection of water 10a into the duct connecting the mixer 102 to the mixer-cooler 103, from where cooling steam 10c loaded with hydrocarbon vapours escapes. As a variant, the water 10b is injected directly into the mixer-cooler 103. On leaving the mixer-cooler 103, the carbonaceous paste 5 then supplies the forming, ensured, as in the method of FIG. 1a, by the press or the vibrating compactor 104, which delivers electrode blocks 6 at the forming outlet.

More recently, patent application WO2011/064461 described a new design of continuous mixer with a horizontal axis described as capable of ensuring both the step of mixing and the step of cooling the carbonaceous paste in a single device.

It is important to note that this mixing step, in the discontinuous or continuous methods described above, as well as in their different embodiments, always relates to all of the granular mixture, without differentiated treatment of any particular granulometric fraction, and that it utilizes a single quality of binder and all of the binder finally required for the manufacture of the electrodes. Similarly it should be noted that, until now, the order of introduction of the raw materials into the mixer is always the same in order to avoid lining the walls of the mixer with binder: first the granular mixture in a single flow, then the liquid bituminous binder also in a single flow.

Moreover, it is noted that, in the mixing-cooling step as known at present, the composition of the paste undergoes no significant change apart from the cooling thereof and the partial degassing of the light organic compounds, and in particular that there is neither any addition of dry products, nor any further addition of binder.

In order to maintain substantially the same penetration rate of the binder without having to mix at a high temperature then cool the paste by injecting water, but simply mixing at close to the forming temperature, it would be possible to envisage using a bituminous binder with a lower SP (typically SP=80 to 90° C. instead of SP=110 to 115° C. commonly used at present, in the case of the manufacture of anodes for the electrolysis of aluminium), the viscosity curve of this binder as a function of the temperature translating along the temperature axis substantially of the same value as the variation in SP. Nevertheless the lowering of the SP generally means lesser vacuum distillation of the tars of crude hydrocarbons and an increased content of intermediate oils in the bituminous binder. Now, these oils generally have a lower C/H molar ratio than the long molecules composing the heavy fraction of the binder. The presence of these oils in the binder therefore results in a deterioration in the coking value of the binder during the baking of the electrodes, and generates new micropore spaces, or even microcracks, during the degassing of the hydrogen-containing compounds in the preheating phase of the baking process, and ultimately leading to a deterioration in the final density of the electrode, and therefore its performance in terms of electrical conductivity and durability, which is of course undesirable.

FR 992 508 describes a method for preparing a carbonaceous paste for the manufacture of electrodes for the electrolysis of aluminium, by mixing a solid and dry granular mixture and a liquid bituminous binder, in the quantity required for the manufacture of the electrodes, the solid and dry granular mixture being a mixture of two fractions of constituents, one of which is a so-called coarse fraction, including aggregates, and the other fraction is a fraction of submillimeter fines, and comprising at least two consecutive mixing steps, a first so-called preimpregnation of the aggregates step, consists of mixing said so-called coarse fraction of the granular mixture with a portion of said bituminous binder, in a quantity at least sufficient for coating the aggregates and at least partially filling open pore spaces in said aggregates, and is followed by a second, so-called covering step which consists of kneading said coarse fraction preimpregnated with bituminous binder and originating from the first mixing step, with the remainder of said bituminous binder, required for the manufacture of the electrodes, and with said fraction of fines of said granular mixture.

3. TECHNICAL PROBLEM TO BE SOLVED

The quality of a carbon electrode is judged above all by low electrical resistivity as well as maximum service life. These two criteria are essentially dependent on the densification of the electrode during its manufacturing process, and more particularly on the residual intergranular voids and open pore spaces not filled by the binder. In fact, both adversely affect the electrical conductivity of the electrode and access routes to the core of the electrode for external compounds which are detrimental to its service life, such as oxygen in the air, carbon dioxide, electrolytic acid salts, etc. Therefore, the objective of the preparation of the paste, the forming thereof and the baking of the electrodes is to obtain baked anodes having virtually zero internal porosity, quantified by a maximum density.

There is a set of actions which contribute to maximizing the final density of an electrode:
  selecting the densest possible carbonaceous material for preparing the dry granular mixture: these materials are not always available in a sufficient quantity and at a reasonable cost, inasmuch as the overall worldwide trend is towards a deterioration in quality of the supply sources, essentially as a consequence of the deterioration in quality of the crude hydrocarbons, generally oil, from which they originate; this way of improvement therefore appears unsustainable and, by contrast, constitutes an additional constraint on the methods for manufacturing carbonaceous electrodes, which will in future have to be increasingly tolerant of a deterioration in the quality of the raw materials;
  preparing the dry granular mixture according to a method which delivers an optimum granulometric composition, by preferentially grinding the aggregates weakened by internal pore spaces or microcracks, for example by means of grinders operating by compression of a bed of material as recommended in patent document WO 2001/38253, or also by means of density separators as recommended in patent document WO 2008/083472, which are already produced industrially and at present offer no further prospect of additional improvement;
  optimizing the quantity of bituminous binder to be injected during the kneading of the paste so that it is sufficient for coating the dry granular mixture, and for filling the open pore spaces of the aggregates and the intergranular voids, without however leading to bleeding of the binder at the end of forming of an electrode by compaction, bleeding which gives rise to adhesion problems during the baking of this electrode: modern control systems now allow in-line automation of this optimization of batching of the binder which therefore no longer constitutes a way of improvement per se;
  ensuring optimal coating and covering of the aggregates with the bituminous binder and maximizing the penetration of the bituminous binder into the open pore spaces of the aggregates during the mixing of the carbonaceous paste by improving the method known from FR 992 508: this is the main object of the proposed invention, the problem of which is further described in this specification;
  then maximizing the degree of compaction of this carbonaceous paste in the electrode-forming machine: this route has been the main focus of development in the last few decades, and existing forming machines (hydraulic presses or vibrating compactors) generally operate under vacuum with optimized cycles and loads which already give them exceptional performance and allow for little significant improvement to be envisaged in this field;

finally achieving these objectives by minimizing the loss of weight, and therefore of density, of the electrode during baking, a loss of weight which is generated by the volatilization of the hydrogen-containing compounds of the bituminous binder prior to coking thereof, which volatilization gives rise to new micropore spaces; this can be achieved:

on the one hand, by minimizing the % of binder required in the preparation of the paste by limiting it to that necessary for maximum coating, covering and penetration rates, which is already carried out by operators, in particular in order to avoid any bleeding of binder during compaction giving rise to adhesion problems during baking;

on the other hand, by using bituminous binders with a high C/H molar ratio, therefore depleted of intermediate oils by vacuum fractional distillation, or even followed by reforming, and therefore having the highest possible SP (typically SP=130° C. minimum, or even 150 to 170° C., instead of SP=110 to 115° C. commonly used now in the case of the manufacture of anodes for the electrolysis of aluminium); however the use of binder with a high SP, without resulting in a deterioration in the coating, covering and penetration qualities, requires operation at higher temperatures throughout the whole chain of handling, storage and utilization of the binder, and now encounters technological limits which still have to be overcome, in particular at the mixing equipment level; however, if these technological limits were overcome, the use of these binders with a high SP would lead to gains in the density of the electrodes after baking, due to the higher C/H ratio of these binders, but without significant improvement in the density of the "raw" electrodes (before baking), since the viscosity of these binders would be substantially equivalent to that of existing binders, therefore without significant improvement in the coating, covering and penetration properties; the basic problem would remain unchanged and the benefit of the invention as proposed therefore remains.

Microscopic observations under polarized lights carried out by the applicant in the context of his research programmes on carbonaceous pastes originating from various mixers have clearly demonstrated that good homogeneous coating of the aggregates with the bituminous binder and good filling of the residual intergranular voids at the end of compaction remain imperfect in the methods known at present, although the quantity of liquid bituminous binder introduced into the mixer is sufficient, or even in slight excess, to cover the extended surface of the aggregates and fill the residual intergranular voids at the end of compaction, and although the mixing apparatus ensures thorough mixing of the mixture without the phenomenon of by-passing one or other of the constituents.

The penetration of the binder within the open pore spaces of the aggregates is a more complex and more difficult operation to implement homogeneously, as it requires both that the binder has free access to these pore spaces and that its rheological characteristics give it sufficient wettability properties.

In theory, if a good homogeneous coating of the aggregates were obtained, the access of the binder to the open pore spaces would potentially be optimum. Nevertheless, the presence of the fines in the dry granular mixture is such as to at least partially block the access of the binder to these open pore spaces. Similarly, the presence of large molecules in the binder (such as the mesophases in the coal tar pitches originating from the coalescence of heavy molecules, in particular during the reforming operations, or also such as the paraffins in the bituminous binders of oil origin) are also such as to at least partially obstruct access to the open pore spaces and slow down the penetration of the binder by capillarity.

FIG. 2a diagrammatically shows an aggregate 201 coated with bituminous binder 203 and fines 202, with an incorrectly coated zone 210, open pore spaces not filled with binder such as the pore space 211, and fines and/or macromolecules 212 blocking access to an open pore space in the aggregate 201, as obtained by implementation of the methods of the state of the art.

Finally, even if the binder had completely free access to the open pore spaces, it would still be necessary for it to be able to advance essentially by capillarity and fill the corresponding voids to the maximum extent. It has been widely established in the literature that the rate of advance by capillarity is directly linked to the ability of the binder to wet the surface of the aggregates, which is itself directly dependent on the viscosity of the binder, other things being equal. Now, as already mentioned above, the viscosity of the bituminous binders at a given operating temperature is a direct function of their SP. Thus, for the purposes of illustration, in the particular case of the manufacture of anodes for the electrolysis of aluminium:

a coal-tar pitch with an SP of 130° C. will have substantially the same viscosity and, consequently, the same rate of penetration by capillarity as a coal-tar pitch with an SP of 110° C. provided that the mixing temperature is increased by the difference between the SPs, i.e. in this case+20° C., and conversely, a pitch with an SP of 90° C. can be mixed 20° C. lower than the pitch with an SP of 110° C. without any substantial change in the rate of penetration into the open pore spaces;

the same extent of penetration by capillarity into a pore space of a given diameter will be reached after several tens of hours (therefore never reached in the industrial methods of the state of the art) if the temperature remains only a few 10 s or 20 s of degrees C. above the SP, therefore with a very high viscosity of the binder, whereas a few minutes will suffice if operating at more than 80 to 90° C. above the SP with a very fluid binder.

In that case also, microscopic observations under polarized light carried out by the applicant in the context of his research programmes on carbonaceous pastes originating from various mixers have clearly demonstrated that this double problem of accessibility of the binder to the open pore spaces and its rate of advance by capillarity, is now an obstacle to the maximum densification of the electrodes, a good number of open pore spaces remaining empty or only partially filled. This dual problem persists even in the case of the manufacture of cathode blocks for the aluminium industry, or of electrodes for electrometallurgical applications, where the preformed carbonaceous blocks are baked for a first time, then re-impregnated (generally under vacuum) with bituminous binder before a second baking step. In fact, the re-impregnation under vacuum is often only partial and does not make it possible to access all of the open pore spaces situated in the core of the carbonaceous blocks.

The present invention proposes a method capable of removing this obstacle and further raising the densification limit of the electrodes.

4. DESCRIPTION OF THE INVENTION

A subject of the invention is a method for preparing a carbonaceous paste for the manufacture of high-density electrodes, by mixing a solid and dry granular mixture and a liquid bituminous binder, of the type known from FR 992 508 and comprising at least two consecutive mixing steps as presented above and which is characterized in that the bituminous binder used in the first mixing step is of a different grade from that of the bituminous binder used in the second mixing step, and in that, during the first mixing step, a bituminous binder is used, with a softening point lower than the softening point of the bituminous binder used during the second mixing step.

Advantageously, the method of the invention can also have one or more of the following characteristics:
  in the second mixing step, the introduction of the balance of the bituminous binder occurs simultaneously with or after the introduction of the preimpregnated coarse fraction originating from the first mixing step, and the introduction of the fraction of fines occurs simultaneously with or after the introduction of the balance of the bituminous binder;
  the fines of the dry granular mixture are premixed with all or part of said balance of the bituminous binder, before introduction of the premixture thus obtained in the second mixing step;
  the qualities of the two bituminous binders with different softening points are obtained by operations of fractional distillation then fluxing starting with a single grade of bituminous binder provided for the preparation of the paste.

A subject of the invention is also an installation for the implementation of the method of the invention as presented above, and which comprises two mixer stages, in continuous or discontinuous mode, the first mixer stage of which, intended for the implementation of the first step of the method, has at least one inlet capable of receiving a solid and dry granular flow of aggregates and a flow of liquid bituminous binder, as well as an outlet capable of delivering a pasty mixture resulting from the first mixing step, and the second mixer stage of which, intended for the implementation of the second so-called covering mixing step, comprises an inlet, capable of receiving said pasty mixture originating from the first mixer stage, as well as at least one other inlet capable of receiving a solid and dry granular flow of fines and a make-up flow of bituminous binder, the second mixer stage also having an outlet capable of delivering the prepared paste, suitable for forming the electrodes, and the installation is capable of storing two binders of different grades each in one respectively of two devices with a storage tank and loop for supplying the first mixer stage and the second mixer stage respectively, as well as with a device for batching each of the two grades of bituminous binder supplying the first mixer stage and the second mixer stage respectively.

Advantageously, the installation of the invention can also have one or more of the following features:
  it comprises, in addition, a device for the separate preheating of the fraction of aggregates and the fraction of fines of the dry granular mixture, as well separate items of handling equipment, one of which is capable of ensuring the supply of the fraction of aggregates in the first mixer stage and the other the supply of the fraction of fines in the second mixer stage; and
  it comprises, in addition, at least one fractional distillation unit, capable of producing two bituminous binders of different grades from the same bituminous binder of intermediate grade.

5. PRESENTATION OF THE FIGURES

Other characteristics and advantages of the invention will become apparent from the description given below, non-limitatively, of example embodiments with reference to the attached drawings in which the same reference numbers denote identical or analogous and corresponding elements. In these drawings:

FIGS. 1a and 1b show diagrammatically and respectively two methods for preparing carbonaceous paste known from the prior art, already described above in the general presentation of the state of the art;

FIG. 2a, already described above, diagrammatically shows an aggregate coated with binder and fines, as obtained by the implementation of the methods of the prior art;

6. IMPLEMENTATION OF THE INVENTION

The present invention is based on the observation that the great majority of the open pore spaces accessible to the binder are concentrated in the coarse fraction of the dry granulometric mixture, the fines having far fewer and smaller-sized pore spaces due to the fact that these fines essentially originate from phenomena of attrition or grinding in steps upstream of the method of the invention.

Figure 3B:
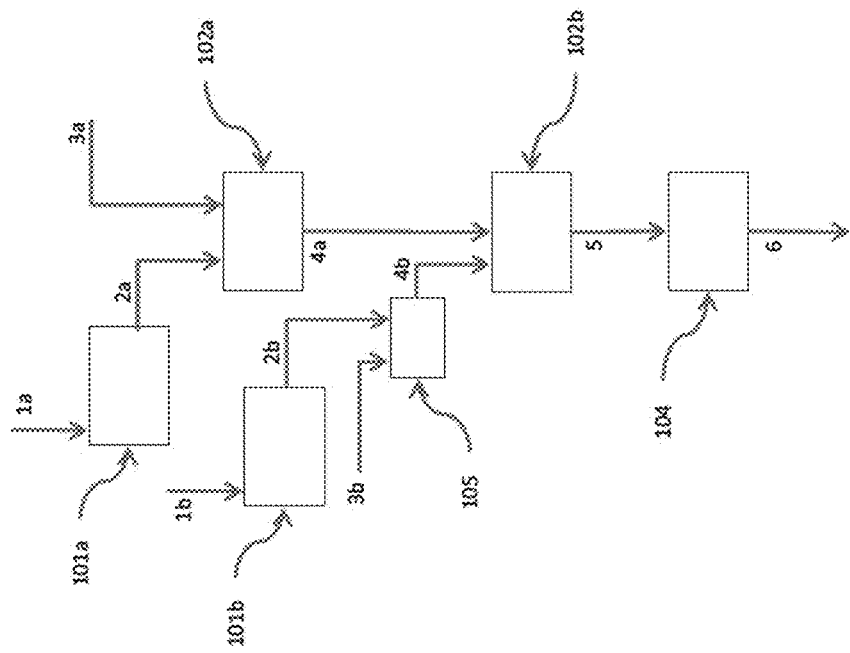
FIGS. 3a and 3b are two diagrammatic views, analogous to FIGS. 1a and 1b, and showing respectively two embodiments of the method according to the invention and corresponding installations.
Figure 3A:
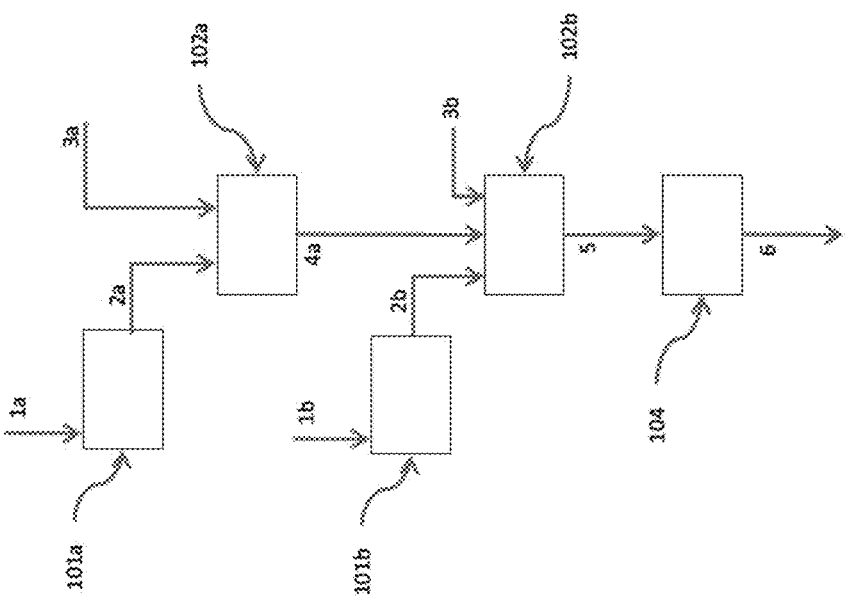

According to the invention, it is proposed to break down the mixing step of the state of the art into two steps specific to the invention, as illustrated in FIG. 3a.

A first, so-called "preimpregnation" mixing step, relates only to the coarse granulometric fraction of the dry granular mixture, with the exception of the fines. This coarse fraction 1a is firstly supplied into a preheater 101a, from where it leaves in the preheated state 2a, in order to be supplied into a first mixer stage 102a, in which this preheated coarse fraction 2a is mixed with only a part 3a of the bituminous binder required for the manufacture of the electrodes, and also supplied into the first mixer stage 102a. This first mixing step aims to promote the access and penetration of the bituminous binder into the pore spaces of the coarse fraction of the dry granular mixture, in the absence of the fines of the dry granular mixture, which facilitates the distribution of the binder around the aggregates and improves the homogeneous coating thereof. This first step is supplied according to the same principle as the mixers of the prior art, namely that the part 3a of bituminous binder is introduced into the first mixer stage 102a simultaneously with or after the preheated coarse granular fraction 2a, so as to avoid lining the walls of the mixer with the binder.

A second, so-called "covering" mixing step, is a step in which the balance of the dry granular mixture, i.e. the fraction of fines (fines or ultrafines), as well as the additional binder required for the manufacture of the electrodes are added to the product leaving the first step. To this end, the coarse fraction 4a precoated with bituminous binder and leaving the first mixer stage 102a, is supplied into a second mixer stage 102b, also supplied, on the one hand, with the preheated fine fraction 2b leaving a second preheater 101b, supplied with the fine fraction 1b, and, on the other hand, with the balance of the bituminous binder required 3b. This second mixing step essentially aims to homogeneously coat all of the granular mixture, and in particular the fines which develop the largest specific surface area, and to distribute these fines, coated as homogeneously as possible between the preimpregnated and precoated aggregates, in order to fill the intergranular voids in the best possible way, as shown diagrammatically in FIG. 2b. In this FIG. 2b, an aggregate 201 is shown coated with precoating bituminous binder 203a, having, in addition, filled the open pore spaces of the aggregate 201, as shown for the pore space 213, by the effect of the first mixing step, and this layer of precoating binder 203a is itself covered with bituminous covering binder 203b, supplied to the second mixer stage 102b, and in which the fines 202, also supplied to this second mixer stage 102b, are distributed substantially homogeneously.

In this second mixing step, in order to avoid the "drying out" of the paste 4a originating from the first step at the time of the addition of the preheated fines 2b, with the peak power and the inherent risks of clogging the mixer, it is ensured that the balance of the bituminous binder 3b required is introduced simultaneously with or after the paste 4a originating from the first mixing step, but simultaneously with or before the balance of the dry granular mixture, i.e. the preheated fine fraction 2b leaving the second preheater 101b of a device for the separate preheating of the coarse and fine fractions, which also comprises the first preheater 101a of the coarse fraction, which is novel with respect to the prior art on several points.

Then, the carbonaceous paste 5 leaving the second mixer stage 102b is ready to supply the forming, which is carried out, as previously, in a press or a vibrating compactor 104, from where the electrode blocks 6 leave, ready for baking. The distribution of the binder 3a, 3b to be injected at each of the two mixing steps can be calculated:
- either so that the product leaving each step has the same content by weight of binder as that required in the final paste 5 for producing the raw electrode;
- or, as a minimum, by injecting in the first step the quantity of binder 3a that is just necessary for coating the aggregates and filling their open pore spaces, and by injecting the remainder of the binder 3b in the second step so as to obtain the content by weight required in the final paste 5 for producing the raw electrode; the fraction of binder 3a required for coating the aggregates in the first step is assessed on a prorata basis with respect to the surface area of the aggregates to be coated in relation to the extended surface of all of the dry granular mixture;
- or also any other distribution intermediate to the two preceding ones and as chosen arbitrarily.

An embodiment of the invention is described below, based on the following basic data:
Production rate: 50 tonnes per hour (t/h) of paste
Content of binder in the raw electrode: 15% by weight, i.e. 7.5 t/h of binder and 42.5 t/h of dry granular mixture
Composition of the dry granular mixture:
  Blaine specific surface area of the dry granular mixture: 3500 cm2/g
  80% coarse fraction i.e. 34 t/h
  20% fine fraction i.e. 8.5 t/h,
Characteristics of the coarse fraction:
  Blaine specific surface area of the coarse fraction alone: approximately 350 cm2/g
  Density: 2.0 kg/dm3,
  % by volume of open pore spaces: estimated at 10%,
Density of the binder: 1.3 kg/dm3
Results:
  For an equal content by weight of binder leaving the two steps:
    flow rate of paste leaving the first step: 42.5×0.80/(1−0.15)=40 t/h
    flow rate of binder to be injected in the first step: 40×0.15=6.0 t/h
    flow rate of binder to be injected in the second step: 7.5−6.0=1.5 t/h
  As a minimum:
    Flow rate of binder to be injected in the first step for coating the coarse fraction: 7.5×(350×40)/(3500×42.5)=0.7 t/h
    Flow rate of binder required in the first step for filling the open pore spaces: (42.5×0.80/2.0)×0.10×1.3=2.2 t/h
    Total flow rate of binder to be injected in the first step: 0.7+2.2=2.9 t/h
    Flow rate of binder to be injected in the second step: 7.5−2.9=4.6 t/h
  Intermediate choice:
    Example: 50/50 equal distribution between the two steps
    Flow rate of binder to be injected in each step: 7.5/2=3.75 t/h The addition of the fraction of fines 2b and the make-up of bituminous binder 3b in the second step can be carried out in two different ways: either for each of them, independently and directly into the mixing apparatus ensuring the implementation of the second mixer stage 102a (see FIG. 3a), or, by contrast, simultaneously in a single flow, after a prior premixing step which has the objective of improving the dispersion of the fines 202 in the covering binder 203b, and subsequently of ensuring their more homogeneous distribution around the preimpregnated aggregates 201 originating from the first mixer stage 102a, as shown in FIG. 3b.

The method according to FIG. 3b differs from that according to FIG. 3a in that the preheated fine fraction 2b leaving the preheater 101b, and the balance of the bituminous binder 3b required directly supply a premixer 105, and in that the paste 4b resulting from this premixing, leaving the premixer 105, is supplied, like the paste 4a leaving the first mixing stage 102a, into the second mixing stage 102b, leaving which the carbonaceous paste 5 supplying the forming 104 is obtained, as under the preceding conditions, in order to obtain moulded electrode blocks 6.

A proposed development of this basic method consists of differentiating between the grade of the binders added at each of the steps in order to take into account the specific objectives of each of them:
Thus, in the first step or preimpregnation step, the objective is essentially to ensure good coating of the aggregates 201 and good filling of their open pore spaces 213. The aim is therefore to use the most fluid binder possible, but also to remain if possible close to the temperature for forming the electrode, in order to avoid an additional step of cooling the paste which generates emissions of light aromatic compounds. For this, a binder with a low SP is therefore chosen, the SP of which is typically at least 50° C., preferably 80° C., below the forming temperature (example: for a forming temperature of 160 to 170° C., a binder with an SP of 80 to 90° C. will be suitable).

In the second step or covering step, the objective is to coat the aggregates 201 and fill the intergranular voids with the fines 202, which are themselves correctly coated with the covering binder 203b and distributed homogeneously, but without there being any need for impregnation of open pore spaces, since the aggregates 201 are already preimpregnated and the fines 202 are by nature not very porous. As indicated previously, this step requires little specific power once the temperature is at least 30° C. above the SP of the binder. It is therefore possible to choose a binder with a higher SP which fulfils this condition close to the forming temperature (example: for a forming temperature of 160 to 170° C., a binder with an SP of 130 to 140° C. will be suitable). The benefit of choosing a binder with a high SP for this second step resides in the need to compensate for the choice of a binder with a low SP for the first, so-called preimpregnation step, in order so far as possible to maintain the coking value of the mixture of the binders and, finally, not to lose the density gain obtained by better impregnation of the aggregates 201, during the baking of the electrodes 6.

Figure 2A:
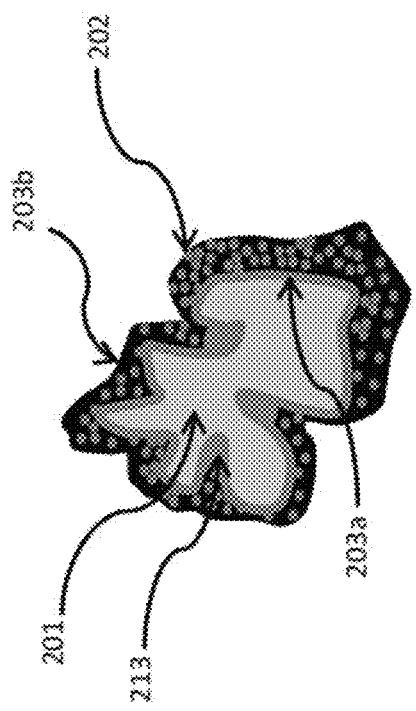
FIG. 2b is a representation analogous to FIG. 2a, of an aggregate with bituminous binder for precoating and penetrating into the open pore spaces of the aggregate, following the first mixer stage, as well as the bituminous binder for covering, following the second mixer stage, according to the method of the invention.
Figure 2B:
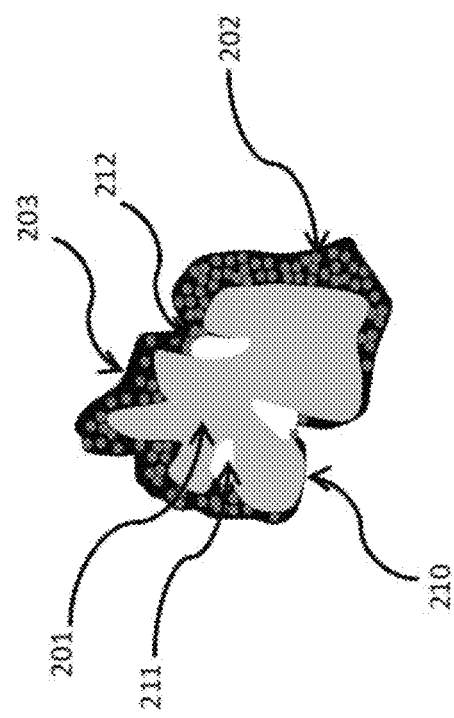

In FIG. 2b, the bituminous binder 203a for precoating and penetrating into the open pore spaces 213 is the binder with a low SP, if two different grades of binder are used, or in the case of two binders with different SPs, whereas the bituminous covering binder 203b is the binder with a high SP.

At this stage, it is therefore assumed that the operator is provided with two different grades of binder, with dedicated storage infrastructures, which can represent a major obstacle. Also, in order to overcome this obstacle, another development proposed for this method allows the operators to implement the invention without modifying the current supply logistics and limiting the impact on the storage infrastructures just by adding a second day tank: it is in fact a matter of inserting, between the main store and the day tanks, a small fractional distillation unit capable of producing a binder with a high SP 203b from a fraction of the crude binder with an average SP. The light oils recovered during this operation are then fluxed with the remaining fraction of the raw binder with an average SP in order to produce the binder with a low SP 203a. Thus, for example, from a binder with an SP of 110° C., and assuming a 50/50 distribution of the binder between the two steps, it is possible to envisage obtaining a binder with an SP of 130° C. 203b and a binder with an SP of 90° C. 203a in this way. This operation makes it possible to obtain two grades of binder 203a, 203b for the implementation of the invention, without creating any new supply constraint for the operator, and without any residual flow to be re-treated.

Figure 1B:
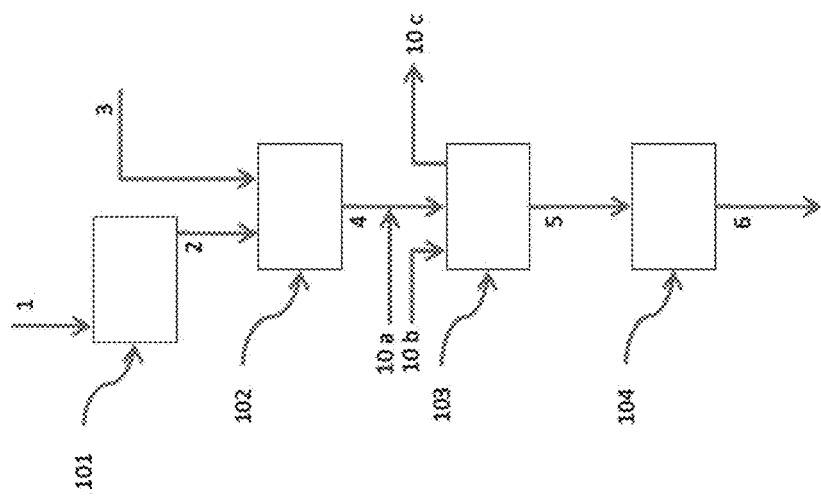
Figure 1A:
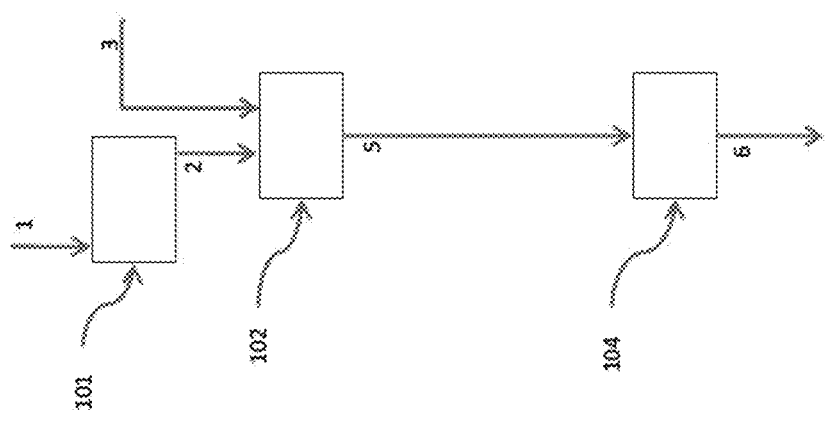

The implementation of the method of the invention, with a single grade of binder or two different grades of binder, can easily be carried out by combining 2 conventional mixer stages, in both discontinuous mode and continuous mode, and is similar in this case to the state of the art with a mixer-cooler 103 (see FIG. 1b). The few operating differences between these devices and the state of the art require only minor modifications:

The first mixer stage 102a, intended for the implementation of the first so-called preimpregnation step, operates either close to the mixing temperature of the current state of the art in the case where a single grade of binder is used, or close to the forming temperature (and not up to 30° C. above) in the case where two different grades of binder are used and where the binder with a low SP 203a is injected in 3a into this first mixing stage 102a. Moreover this first stage 102a receives, at the inlet, a granular flow and a binder liquid flow as in the current state of the art, in order to produce, at the outlet, a more grainy and therefore less adhesive paste than in the conventional method: rather, all of the operating conditions develop in a very favourable direction.

The second mixer stage 102b, intended for the implementation of the second so-called covering step, operates close to the forming temperature, in the same way as a mixer-cooler of the state of the art, but receives at the inlet, on the one hand, the granular paste 4a discharged from the first stage 102a, and, on the other hand, the fines 2b and the make-up binder 3b, which is the binder with a high SP if two grades of binder are used, preferably mixed together beforehand in 105, instead of the injection of cooling water into the abovementioned mixer-cooler of the state of the art, in order to finally produce a paste 5 which is denser but at virtually the same temperature as the paste according to the state of the art.

Alternatively, the implementation of the method of the invention can be envisaged with a single item of mixing equipment, with the obvious advantage of this solution in terms of installation and capital expenditure cost:

either by discontinuous mixing, with the sequential introduction of the materials as described above and specific to the invention, so as to have a succession, in the cycle of the device, of a phase of preimpregnation (102a) of the aggregates (2a) with the binder with a low SP (3a), followed by a phase of covering (102b) these preimpregnated aggregates (4a) by the addition of the binder with a high SP (3b) then fines (2b), or alternatively by the addition of the fines and of the binder with a high SP (3b) which are premixed (in 105);

or by continuous mixing, which incorporates the sequential introduction of the materials into the mixer as described above and specific to the invention, so as to create within the mixer, an upstream, so-called preimpregnation zone of the aggregates (2a) with the binder with a low SP (3a), followed by a downstream so-called covering zone of these aggregates preimpregnated with the binder with a high SP (3b) then fines (2b), or alternatively by the addition of the premixed fines (2b) and binder with a high SP (3b).

Thus, for example, it is possible to envisage introducing the aggregates (2a) at the upstream end of a horizontal tubular mixer, followed immediately afterwards by the introduction of the binder with a low SP (3a), then, after a length sufficient for the preimpregnation of the aggregates, typically half-way along the mixing zone, introducing the binder with a high SP (3b) followed immediately by the introduction of the fines (2b), the carbonaceous final paste (5) being discharged at the downstream end of the horizontal mixer after a length sufficient for the homogeneous covering of the aggregates with the mixture of fines (2b) and binder with a high SP (3b). Alternatively, it is possible to directly introduce, half-way along the mixer, the mixture of fines (2b) and binder with a high SP (3b).

Similarly it is possible to envisage, for example, the use of a continuous mixer, as described in patent document WO2011/064461, in which the upstream zone is modified in order to be divided into two zones: upstream, a preimpregnation zone supplied with the aggregates (2a) and the binder with a low SP (3a), then a device for supplying, in succession, the binder with a high SP (3b) then fines (2b), or, alternatively, a mixture of both of these, followed by a downstream covering zone, the zone for cooling the paste as described in patent document WO2011/064461 being dispensed with. In this configuration, the pressure roller as well as the deagglomeration device and the distributing flap equip the entire useful length of the device.

Or also, any other configuration of mixer, which allows for the sequential introduction of the materials as described in the invention, so as to provide a zone for preimpregnating the aggregates followed by a covering zone.

In any event, the implementation of the invention either with a single mixer or with two mixers in series, also requires modification of the upstream part of the conventional treatment installation in order to incorporate therein the additional equipment required for the supply of the new method, namely:

A separate preheating (101a, 101b) of the aggregates (1a) and of the fines (1b) in the dry granular mixture, as well as separate handling equipment up to their point of injection into one or other of the mixers;

Optionally, for the use of binders of different grades in the preimpregnation zone and step and in the covering zone and step:

either, in the case of separate supplies of the two grades of binder, a second storage tank for receiving the deliveries of the second grade of binder, with its own reheating, loading and unloading devices;

or, in the case where a single supply of an intermediate grade of binder is maintained, a unit for the production of the two grades of binder based on the existing single storage unit;

in both cases, a second day storage tank, with a loop for supplying and batching the second grade of binder;

Optionally, a stirred tank for premixing (105) the fines (2b) and the binder with a high SP (3b) with a specific extraction/batching system, for directly supplying this premixture to the covering zone inlet.

The invention claimed is:

1. A method for preparing a carbonaceous paste for the manufacture of high-density electrodes, by mixing a solid and dry granular mixture and a liquid bituminous binder, in a quantity required for the manufacture of the electrodes, the solid and dry granular mixture being a mixture of two fractions of constituents, one of which is a coarse fraction, including aggregates having open pores, and the other fraction is a fraction of submillimeter fines, comprising at least two consecutive mixing steps, a first mixing step, of which an aggregate-preimpregnation step consists of mixing said coarse fraction of the granular mixture with a part of said bituminous binder, in a quantity at least sufficient for coating the aggregates and at least partially filling the open pore spaces of said aggregates, and is followed by a second mixing step, called a covering step, which consists of mixing said preimpregnated coarse fraction of bituminous binder and originating from the first mixing step, with the balance of said bituminous binder, required for the manufacture of the electrodes, and with said fraction of fines of said granular mixture, wherein the bituminous binder used in the first mixing step is of a grade different from that of the bituminous binder used in the second mixing step, and wherein, during the first mixing step, a bituminous binder is used, with a lower softening point than the softening point of the bituminous binder used during the second mixing step.

2. The method according to claim 1, wherein, in the second mixing step, the introduction of the balance of the bituminous binder occurs simultaneously with or after the introduction of the preimpregnated coarse fraction originating from the first mixing step, and wherein the introduction of the fraction of fines occurs simultaneously with or after the introduction of the balance of the bituminous binder.

3. The method according to claim 1, wherein the fines of the dry granular mixture are premixed with all or part of said balance of the bituminous binder, then the premixture thus obtained is introduced into the second mixing step.

4. The method according to claim 1, wherein the grades of the two bituminous binders with different softening points are obtained by fractional distillation operations then fluxing from a single grade of bituminous binder provided for preparing the paste.

5. An installation for the implementation of the method according to claim 1, comprising two mixer stages, in continuous or discontinuous mode, the first mixer stage of which (102a), intended for the implementation of the first step of the method, has at least one inlet capable of receiving a solid and dry granular flow of aggregates (2a) and a flow of liquid bituminous binder (3a), as well as an outlet capable of providing a pasty mixture (4a) resulting from the first mixing step, and the second mixer stage of which (102b), intended for the implementation of the second covering mixing step, comprises an inlet capable of receiving said pasty mixture (4a) originating from the first mixer stage (102a), as well as at least one other inlet capable of receiving a solid and dry granular flow of fines (2b) and a make-up flow (3b) of bituminous binder, the second mixer stage (102b) also having an outlet capable of delivering the prepared paste (5), suitable for the forming of the electrodes (6), and the installation being capable of storing two binders of different grades each in one respectively of two devices with a storage tank and loop for supplying the first mixer stage (102a) and the second mixer stage (102b) respectively, as well as with a device for batching each of the two grades of bituminous binder (3a, 3b) supplying the first mixer stage (102a) and the second mixer stage (102b), respectively.

6. The installation according to claim 5, further comprising, two devices (101a, 101b) for separately preheating the fraction of aggregates (1a) and the fraction of fines (1b) of the dry granular mixture, as well as respective separate items of handling equipment, one item of handling equipment being capable of supplying the fraction of aggregates in the first mixer stage (102a) and one item of handling equipment being capable of supplying the fraction of fines in the second mixer stage (102b).

7. The installation according to claim 5, further comprising, at least one fractional distillation unit, capable of producing two bituminous binders (3a, 3b) of different grades from the same bituminous binder of intermediate grade.

8. The method according to claim 2, wherein the fines of the dry granular mixture are premixed with all or part of said balance of the bituminous binder, then the premixture thus obtained is introduced into the second mixing step.

9. The method according to claim 2, wherein the grades of the two bituminous binders with different softening points are obtained by fractional distillation operations then fluxing from a single grade of bituminous binder provided for preparing the paste.

10. The method according to claim 3, wherein the grades of the two bituminous binders with different softening points are obtained by fractional distillation operations then fluxing from a single grade of bituminous binder provided for preparing the paste.

11. An installation for the implementation of the method according to claim 2, comprising two mixer stages, in continuous or discontinuous mode, the first mixer stage of which (102a), intended for the implementation of the first step of the method, has at least one inlet capable of receiving a solid and dry granular flow of aggregates (2a) and a flow of liquid bituminous binder (3a), as well as an outlet capable of providing a pasty mixture (4a) resulting from the first mixing step, and the second mixer stage of which (102b), intended for the implementation of the second covering mixing step, comprises an inlet capable of receiving said pasty mixture (4a) originating from the first mixer stage (102a), as well as at least one other inlet capable of receiving a solid and dry granular flow of fines (2b) and a make-up flow (3b) of bituminous binder, the second mixer stage (102b) also having an outlet capable of delivering the prepared paste (5), suitable for the forming of the electrodes (6), and the installation being capable of storing two binders of different grades each in one respectively of two devices with a storage tank and loop for supplying the first mixer stage (102a) and the second mixer stage (102b) respectively, as well as with a device for batching each of the two grades of bituminous binder (3a, 3b) supplying the first mixer stage (102a) and the second mixer stage (102b), respectively.

12. An installation for the implementation of the method according to claim 3, comprising two mixer stages, in continuous or discontinuous mode, the first mixer stage of which (102a), intended for the implementation of the first step of the method, has at least one inlet capable of receiving a solid and dry granular flow of aggregates (2a) and a flow of liquid bituminous binder (3a), as well as an outlet capable of providing a pasty mixture (4a) resulting from the first mixing step, and the second mixer stage of which (102b), intended for the implementation of the second covering mixing step, comprises an inlet capable of receiving said pasty mixture (4a) originating from the first mixer stage (102a), as well as at least one other inlet capable of receiving a solid and dry granular flow of fines (2b) and a make-up flow (3b) of bituminous binder, the second mixer stage (102b) also having an outlet capable of delivering the prepared paste (5), suitable for the forming of the electrodes (6), and the installation being capable of storing two binders of different grades each in one respectively of two devices with a storage tank and loop for supplying the first mixer stage (102a) and the second mixer stage (102b) respectively, as well as with a device for batching each of the two grades of bituminous binder (3a, 3b) supplying the first mixer stage (102a) and the second mixer stage (102b), respectively.

13. An installation for the implementation of the method according to claim 4, comprising two mixer stages, in continuous or discontinuous mode, the first mixer stage of which (102a), intended for the implementation of the first step of the method, has at least one inlet capable of receiving a solid and dry granular flow of aggregates (2a) and a flow of liquid bituminous binder (3a), as well as an outlet capable of providing a pasty mixture (4a) resulting from the first mixing step, and the second mixer stage of which (102b), intended for the implementation of the second covering mixing step, comprises an inlet capable of receiving said pasty mixture (4a) originating from the first mixer stage (102a), as well as at least one other inlet capable of receiving a solid and dry granular flow of fines (2b) and a make-up flow (3b) of bituminous binder, the second mixer stage (102b) also having an outlet capable of delivering the prepared paste (5), suitable for the forming of the electrodes (6), and the installation being capable of storing two binders of different grades each in one respectively of two devices with a storage tank and loop for supplying the first mixer stage (102a) and the second mixer stage (102b) respectively, as well as with a device for batching each of the two grades of bituminous binder (3a, 3b) supplying the first mixer stage (102a) and the second mixer stage (102b), respectively.

14. An installation according to claim 6, further comprising, at least one fractional distillation unit, capable of producing two bituminous binders (3a, 3b) of different grades from the same bituminous binder of intermediate grade.

15. The method according to claim 8, wherein the grades of the two bituminous binders with different softening points are obtained by fractional distillation operations then fluxing from a single grade of bituminous binder provided for preparing the paste.

16. An installation for the implementation of the method according to claim 8, comprising two mixer stages, in continuous or discontinuous mode, the first mixer stage of which (102a), intended for the implementation of the first step of the method, has at least one inlet capable of receiving a solid and dry granular flow of aggregates (2a) and a flow of liquid bituminous binder (3a), as well as an outlet capable of providing a pasty mixture (4a) resulting from the first mixing step, and the second mixer stage of which (102b), intended for the implementation of the second covering mixing step, comprises an inlet capable of receiving said pasty mixture (4a) originating from the first mixer stage (102a), as well as at least one other inlet capable of receiving a solid and dry granular flow of fines (2b) and a make-up flow (3b) of bituminous binder, the second mixer stage (102b) also having an outlet capable of delivering the prepared paste (5), suitable for the forming of the electrodes (6), and the installation being capable of storing two binders of different grades each in one respectively of two devices with a storage tank and loop for supplying the first mixer stage (102a) and the second mixer stage (102b) respectively, as well as with a device for batching each of the two grades of bituminous binder (3a, 3b) supplying the first mixer stage (102a) and the second mixer stage (102b), respectively.

17. An installation for the implementation of the method according to claim 9, comprising two mixer stages, in continuous or discontinuous mode, the first mixer stage of which (102a), intended for the implementation of the first step of the method, has at least one inlet capable of receiving a solid and dry granular flow of aggregates (2a) and a flow of liquid bituminous binder (3a), as well as an outlet capable of providing a pasty mixture (4a) resulting from the first mixing step, and the second mixer stage of which (102b), intended for the implementation of the second covering mixing step, comprises an inlet capable of receiving said pasty mixture (4a) originating from the first mixer stage (102a), as well as at least one other inlet capable of receiving a solid and dry granular flow of fines (2b) and a make-up flow (3b) of bituminous binder, the second mixer stage (102b) also having an outlet capable of delivering the prepared paste (5), suitable for the forming of the electrodes (6), and the installation being capable of storing two binders of different grades each in one respectively of two devices with a storage tank and loop for supplying the first mixer stage (102a) and the second mixer stage (102b) respectively, as well as with a device for batching each of the two grades of bituminous binder (3a, 3b) supplying the first mixer stage (102a) and the second mixer stage (102b), respectively.

18. An installation for the implementation of the method according to claim 10, comprising two mixer stages, in continuous or discontinuous mode, the first mixer stage of which (102a), intended for the implementation of the first step of the method, has at least one inlet capable of receiving a solid and dry granular flow of aggregates (2a) and a flow of liquid bituminous binder (3a), as well as an outlet capable of providing a pasty mixture (4a) resulting from the first mixing step, and the second mixer stage of which (102b), intended for the implementation of the second covering mixing step, comprises an inlet capable of receiving said pasty mixture (4a) originating from the first mixer stage (102a), as well as at least one other inlet capable of receiving a solid and dry granular flow of fines (2b) and a make-up flow (3b) of bituminous binder, the second mixer stage (102b) also having an outlet capable of delivering the prepared paste (5), suitable for the forming of the electrodes (6), and the installation being capable of storing two binders of different grades each in one respectively of two devices with a storage tank and loop for supplying the first mixer stage (102a) and the second mixer stage (102b) respectively, as well as with a device for batching each of the two grades of bituminous binder (3a, 3b) supplying the first mixer stage (102a) and the second mixer stage (102b), respectively.

19. An installation for the implementation of the method according to claim 15, comprising two mixer stages, in continuous or discontinuous mode, the first mixer stage of which (102a), intended for the implementation of the first step of the method, has at least one inlet capable of receiving a solid and dry granular flow of aggregates (2a) and a flow of liquid bituminous binder (3a), as well as an outlet capable of providing a pasty mixture (4a) resulting from the first mixing step, and the second mixer stage of which (102b), intended for the implementation of the second covering mixing step, comprises an inlet capable of receiving said pasty mixture (4a) originating from the first mixer stage (102a), as well as at least one other inlet capable of receiving a solid and dry granular flow of fines (2b) and a make-up flow (3b) of bituminous binder, the second mixer stage (102b) also having an outlet capable of delivering the prepared paste (5), suitable for the forming of the electrodes (6), and the installation being capable of storing two binders of different grades each in one respectively of two devices with a storage tank and loop for supplying the first mixer stage (102a) and the second mixer stage (102b) respectively, as well as with a device for batching each of the two grades of bituminous binder (3a, 3b) supplying the first mixer stage (102a) and the second mixer stage (102b), respectively.

\* \* \* \* \*